US005635588A

United States Patent [19]
Eshuis et al.

[11] Patent Number: 5,635,588
[45] Date of Patent: Jun. 3, 1997

[54] POLYMERISATION OF GLYCEROL USING A ZEOLITE CATALYST

[75] Inventors: Johan I. Eshuis, Schiedam; Johannes A. Laan, Breda; Ronald P. Potman, Schiedam, all of Netherlands

[73] Assignee: Unichema Chemie B.V., Gouda, Netherlands

[21] Appl. No.: 501,040

[22] PCT Filed: Feb. 3, 1994

[86] PCT No.: PCT/EP94/00318

§ 371 Date: Dec. 20, 1995

§ 102(e) Date: Dec. 20, 1995

[87] PCT Pub. No.: WO94/18259

PCT Pub. Date: Aug. 18, 1994

[30] Foreign Application Priority Data

Feb. 10, 1993 [EP] European Pat. Off. ............. 93200356

[51] Int. Cl.⁶ .................... C08G 65/10; C08G 65/34; C08G 65/16
[52] U.S. Cl. .................. 528/395; 568/853; 549/453; 549/513
[58] Field of Search ................. 568/853; 549/453, 549/513; 528/395

[56] References Cited

U.S. PATENT DOCUMENTS 3,968,169  7/1976  Seiden et al. ................. 568/680

FOREIGN PATENT DOCUMENTS 505000  9/1992  European Pat. Off. .

OTHER PUBLICATIONS

Kempe, et al: "Herstellung von 2,2-dimethyl-4-methylol-1,3-dioxolan", Z. Chemie, vol. 26, No. 3, 1986, pp. 97–98.

Database WPI, Derwent Publications Ltd., AN 86-322229(49) & JP,A,61 238 749, Oct. 24, 1986 cited in the application, see abstract.

*Primary Examiner*—Johann Richter
*Assistant Examiner*—Laura L. Stockton
*Attorney, Agent, or Firm*—Cushman Darby & Cushman IP Group Pillsbury Madison & Sutro LLP

[57] ABSTRACT

Disclosed herein is a process wherein glycerol, glycidol or 2,2-dimethyl-1,3-dioxolane-4-methanol is polymerized in the presence of an acid zeolite having an average pore size of at least 0.6 nanometer at 150°–250° C. At least 50 wt. % of cyclic polymers are obtained.

7 Claims, No Drawings

POLYMERISATION OF GLYCEROL USING A ZEOLITE CATALYST

This application is a 371 of PCT/EP94/00318 filed Feb. 3, 1994.

The present invention relates to a process of preparing polymers of glycerol in which glycerol or its derivatives glycidol or ispropylidene glycerol (or 2,2-dimethyl-1,3-dioxolane-4-methanol) are polymerized in the presence of a zeolite.

Such a process is known from Japanese Patent Application JP-A-61/238,749 (Nippon Oils and Fats Co. Ltd.) in which a process has been described of manufacturing polyglycerol, in which glycerol is condensed after addition of 0.1–5 wt % of alkali catalyst and the same amount of an aluminium oxide adsorbent. Examples of the adsorbent of the aluminium oxide type are activated alumina and adsorbents containing at least 5 wt % of alumina, such as activated clays, synthetic adsorbents and zeolites.

The aluminium oxide adsorbent provides a decolourizing effect during the reaction and also exhibits a catalytic effect in that it particularly prevents the formation of cyclic polymers of glycerol. In an example 100 parts of glycerol are condensed for 5 hours at 250° C. in an inert gas atmosphere in the presence of 1 wt % of sodium hydroxide and 1 wt % of zeolite (manufactured by Mizusawa Kagaku, but no further particulars have been given). The product obtained has a disadvantageous colour, contains a large amount of non-polymerized glycerol and has a total content of only 10.5 wt % of cyclic polymers. The analytical data given do not appear to be very reliable, however, because in some of the examples the total amount of components is well over 100%.

In British Patent Specification GB-A-1,458,569 (The Procter & Gamble Comp.) polyglycerol is prepared by condensing glycerol in the presence of 2.56 wt % of monoacetin and 0.11 wt % of sulphuric acid. The application of this acid catalyst leads to 2.6 and 3.1 wt % of cyclic polymers in the final product.

In International Patent Application WO 93/25511 (Henkel.) which was filed on 4 Jul. 1993, but which has a priority date of 12 Jun. 1992 there has been disclosed a process of oligomerizing glycerol to form preponderantly linear diglycerol. This formation of diglycerol is effected by using a zeolite catalyst. The zeolites which can be used according to this reference are natural zeolites, like chabasite, erionite or clinoptilolithe, and synthetic zeolites, such as zeolite X, zeolite Y, zeolite L, mordenite and particularly zeolite A. In the examples Wessalite CD (ex Degussa, Frankfurt) having a pore size of 0.42 nanometer and zeolite 13X (ex Union Carbide, U.S.A.) having a pore size of 0.7 nanometer have been used, both zeolites being in the alkaline form. It cannot be deduced from this reference that the use of acid zeolites having a specific pore size would lead to oligomers of glycerol with a high percentage of cyclic oligomers.

It has now been found that polymers of glycerol with a high percentage of cyclic polymeric products are obtained if glycerol or its derivatives glycidol or isopropylidene glycerol are polymerized in the presence of an acid zeolite catalyst which has an average pore diameter of at least 0.6 nanometer (nm).

Zeolites are crystalline aluminosilicates of alkali metals or alkaline earth metals, represented by the general formula $M_{2/n}O.Al_2O_3.ySiO_2.wH_2O$ where y is 2 or greater, n is the cation valence and w represents the water contained in the zeolite. Particularly, the so-called Y zeolites and zeolite beta appeared to be very effective in the present invention.

Surprisingly no polymerization of glycerol took place when the glycerol was heated in the presence of synthetic bleaching earth or an acid activated montmorillonite, whereas acid activated bleaching earth only gave some polymerization with only linear polymerization products. Moreover, it appeared that zeoliteS having an average pore diameter or size below 6 nanometer (nm) did not or hardly produce any cyclic polymerization products. An advantage of the use of the acid zeolite catalysts is that they can easily be regenerated, e.g. by heating them to 550° C. while passing through an inert gas, like nitrogen.

Therefore, the present invention relates to a process of preparing polymers of glycerol in which glycerol, glycidol or 2,2-dimethyl-1,3-dioxolane-4-methanol is polymerized in the presence of a zeolite, which is characterized by the fact that an acid zeolite having an average pore size of at least 0.6 nanometer is used. Preferably, the acid zeolite is an Y zeolite or a zeolite beta. The amount of catalyst used may vary over a wide range from about 10% by weight to 100% by weight based on the glycerol, glycidol or isopropylidene glycerol, but preferably from 20 wt % to 30 wt % is used.

In effecting the reaction an inert gas atmosphere may be used, such as a nitrogen blanket. The temperature at which the reaction is effected varies from 150° C. to 350° C., although also somewhat lower temperatures may be used. Preferably, a temperature of from 180° C. to 220° C. is used. A very effective method of heating is the application of microwaves. The reaction may also be favourably influenced by the application of ultrasonic vibrations. In general, the process according to the present invention provides polymerized glycerol having at least 50% by weight, based on the reaction mixture freed from non-polymerized glycerol, of cyclic polymers of glycerol. Usually, this percentage is higher, however.

It is possible to use an acid catalyst together with the acid zeolite, although in general this will not be necessary. As acid catalyst strong inorganic acids, such as sulphuric acid or phosphoric acid, or strong organic acids may be used. The obtained cyclic polymers of glycerol can be used as raw materials in a number or organic syntheses, but particularly in drilling fluids, also of the emulsion type.

The invention will now be illustrated by the following examples.

EXAMPLE I

Glycerol (200 grams) was heated to 200° C. with stirring in a three-necked flask while passing through nitrogen. Subsequently, 20 wt % (based on the glycerol) of an acidic beta zeolite (Valfor CP 811 BL ex Philadelphia Quartz Zeolites B. V., The Netherlands, having an $SiO_2/Al_2O_3$ molar ratio of 25, an $Na_2O$ content of 0.1 wt %, a crystal size of 0.1–0.7 μm, an average particle size of 1–2 μm, a surface area (p/po=0.3) of 750 $m^2$/g, a cyclohexane adsorption capacity of 22 g/100 g and an average pore size of 0.73 nm) was added. The water formed during the reaction was distilled off by means of a Dean-Stark trap. After 2 hours all the glycerol had disappeared (as detected by gas chromatography). The reaction mixture was cooled to room temperature, diluted with 500 grams of water, filtered and evaporated (60° C., 1333 kpa 2 (10 mm Hg)). The yield was 120 grams of polymer of which 30 wt % consisted of 5-hydroxymethyl-1,4-dioxane-2-methanol (A) and 6 hydroxymethyl-1,4-dioxane-2-methanol (B), 30 wt % of 3-(2,3-dihydroxypropoxy)-propane-1,2-diol (C) and 3-(2-hydroxy-1-hydroxymethyl-ethoxy)-propane-1,2-diol (D), 10 wt % of higher oligomers and 30 wt % of 3-(5-hydroxymethyl-1,4-dioxane-2 ylmethoxy)-propane-1,2-diol (E), 3-(6-hydroxymethyl-1,4-dioxane-2-ylmethoxy)-propane-1,3-diol (F), 2-(5-hydroxymethyl-1,4-dioxane-2-ylmethoxy)-propane-1,3-diol (G) and 3-(6-hydroxymethyl-1,4-dioxane-2-ylmethoxy)-propane-1,3-diol (H).

Analysis of the product mixtures was carried out by gas chromatography (GC) on a Hewlett Packard 5880 apparatus, using a 50 cm×2 mm column packed with 3% OV-1 on gaschrom Q. A linear temperature programme was run from 100°–300 °C. at a rate of 10° C./minute with an initial time of 10 minutes at 100° C. and a final time of 10 minutes at 300° C. Structural assignment was made by combined gas chromatography/mass spectrometry (CG/MS) on a Hewlett Packard 5970 B apparatus with the mass spectrometer operating in the electron impact mode, using a 10 m capillary. CP-Sil 5 CB column. A linear temperature programme was run from 50°–275 °C. at a rate of 5° C./minute with an initial time of 3 minutes at 50° C. and a final time of 20 minutes at 275° C.

For both GC and GC/MS, samples were analysed as the silyl derivatives by reacting them with a mixture of hexamethyldisilazane (30 parts) and trimethylsilylchloride (15 parts) in pyridine (100 parts) prior to injection.

EXAMPLE II 2,2-dimethyl-1,3-dioxolane-4-methanol (200 grams) was heated to 200° C. with stirring in a three-necked flask, while passing through nitrogen. Subsequently, 20 wt % of an acidic Y zeolite (CBV 780 ex Philadelphia Quartz Zeolites B. V., The Netherlands; unit all size 2.425 nanometer; $SiO_2/Al_2O_3$ molar ratio 80, $Na_2O$ content 0.03 wt %, crystal size 0.4–0.6 μm, surface area (p/po=0.03) of 780 m2/g, loss on ignition (at 1000° C.) 5,4 wt % average pore size 0.74 nm) were added. The acetone formed during the reaction was distilled off by means of a Dean-Stark trap. After 1 hour all of the starting material had disappeared (gas chromatographically determined). The reaction mixture was cooled to room temperature, diluted with 500 grams of water, filtered and evaporated (60° C., 1333 kpa (10 mm Hg)). The yield was 120 grams of polymeric material containing 50 wt % of (A) and (B), 25 wt % of (E)–(H) and 25 wt % high oligomers.

Comparative examples (1) 100 grams of glycerol were heated with a mixture of 5 grams of sodium hydroxide and 5 grams of zeolite Valfor CP 811 BL (as described in Example I) for 24 hours at 200° C., while passing through nitrogen. No glycerol had been polymerized after 24 hours.

(2) 100 grams of glycerol were heated with 20 wt % of sodium mordenite (CBV 10A, ex Philadelphia Quartz Zeolites B. V., The Netherlands; $SiO_2/Al_2O_3$ molar ratio 12.8; $Na_2O/Al_2O_3$ molar ratio 1.02; surface area lp/po=0.03) 450 $m^2/g$, loss on ignition (at 100° C.) 10.0 wt %) for 24 hours at 200° C., while passing through nitrogen. After 24 hours no polymerization of glycerol had taken place.

(3) 100 grams of glycerol were heated with 20 wt % of a zeolite Y in the sodium form (CB V 780 as used in Example II, but in the sodium form) for 24 hours at 200° C., while passing through nitrogen. After 24 hours no conversion of glycerol had taken place.

We claim:

1. A process of preparing polymers of glycerol in which glycerol, glycidol or 2,2-dimethyl-1,3-dioxolane-4-methanol is polymerized in the presence of a zeolite, characterized in that an acid zeolite having an average pore size of at least 0.6 nanometer is used.

2. A process according to claim 1, characterized in that the acid zeolite is an Y zeolite or a zeolite beta.

3. A process according to claim 1 or 2, characterized in that the amount of acid zeolite used is from 10% by weight to 100% by weight, based on the weight of the glycerol, glycidol or 2,2-dimethyl-1,3-dioxolane-4-methanol.

4. A process according to claims 1 or 2, characterized in that the amount of acid zeolite used is from 20% by weight to 30% by weight, based on the weight of the glycerol, glycidol or 2,2-dimethyl-1,3-dioxolane-4-methanol.

5. A process according to any one of claims 1–4, characterized in that a reaction temperature of from 150° C. to 350° C. is used.

6. A process according to any one of claims 1–4, characterized in that a reaction temperature of from 180° C. to 220° C. is used.

7. A process according to any one of claims 1–6, characterized in that at least 50% by weight, based on the reaction mixture freed from non-polymerized gycerol, of cyclic polymers are formed.

* * * * *